United States Patent [19]
McKenzie

[11] Patent Number: 5,771,938
[45] Date of Patent: Jun. 30, 1998

[54] WATER MAIN BREAK REPAIR TOOL

[76] Inventor: Lowell McKenzie, 106 Harrison St., Sunbury, Ohio 43074

[21] Appl. No.: 850,375

[22] Filed: May 2, 1997

[51] Int. Cl.⁶ ..................................................... F16L 55/16
[52] U.S. Cl. ............................................. 138/99; 138/97
[58] Field of Search ....................... 138/99, 97; 285/373, 285/419, 420; 156/287; 264/269, 36

[56] References Cited

U.S. PATENT DOCUMENTS

| | | | |
|---|---|---|---|
| 518,805 | 4/1894 | Cooper | 138/99 |
| 2,504,881 | 4/1950 | Russell | 138/99 |
| 2,508,241 | 5/1950 | Ferris | 138/99 |
| 3,487,857 | 1/1970 | Lee | 138/99 |
| 3,502,112 | 3/1970 | Hankila | 138/99 |
| 4,535,822 | 8/1985 | Rogers, Jr. | 138/99 |
| 5,437,489 | 8/1995 | Sanders et al. | 138/99 X |
| 5,577,535 | 11/1996 | Motta et al. | 138/99 |
| 5,630,446 | 5/1997 | Stallings | 138/99 |

FOREIGN PATENT DOCUMENTS

| | | | |
|---|---|---|---|
| 602299 | 12/1925 | France | 138/99 |
| 54-109624 | 8/1979 | Japan | 138/99 |
| 1725008 | 4/1992 | U.S.S.R. | 138/99 |
| 210647 | 2/1924 | United Kingdom | 138/99 |

Primary Examiner—Patrick F. Brinson

[57] ABSTRACT

A new water main break repair tool for permitting repair of a broken water main without depressurizing the water main. The inventive device includes an elongate shaft with a grasping handle attached to an upper end thereof. First and second clamping assemblies are pivotally connected to a lower end of the shaft for clamping a water main therebetween. A sealing band is attached at one end thereof to the first clamping assembly while the opposite end of the band is attached to the second clamping assembly. The sealing band forms a sealed channel around a break in the water main when the main is clamped between the clamping assemblies. A manually operated actuating assembly is provided for pivoting the clamping assemblies into and out of engagement with the water main, while a locking lever maintains the assemblies in the clamped position around the water main.

13 Claims, 3 Drawing Sheets

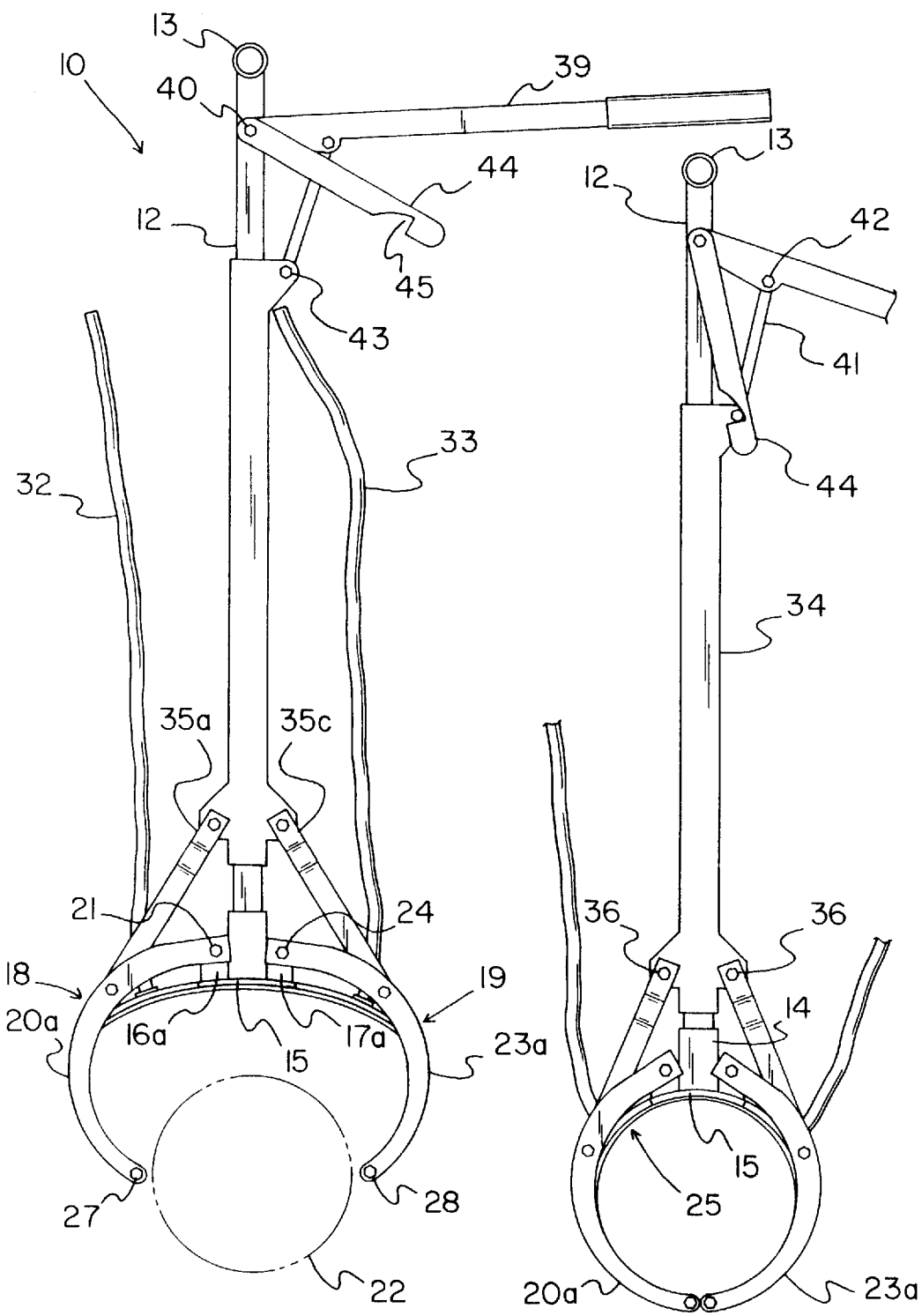

WATER MAIN BREAK REPAIR TOOL

BACKGROUND OF THE INVENTION

1. Field of the Invention

The present invention relates to tools for repairing, or facilitating repair of, broken pipes and the like, and more particularly pertains to a new water main break repair tool for permitting repair of a broken water main without depressurizing the water main.

2. Description of the Prior Art

The use of tools for repairing, or facilitating repair of, broken pipes and the like, is known in the prior art. More specifically, tools for repairing, or facilitating repair of, broken pipes and the like heretofore devised and utilized are known to consist basically of familiar, expected and obvious structural configurations, notwithstanding the myriad of designs encompassed by the crowded prior art which have been developed for the fulfillment of countless objectives and requirements.

Known prior art tools for repairing, or facilitating repair of, broken pipes and the like include U.S. Pat. No. 4,342,338; U.S. Pat. No. 4,756,338; U.S. Pat. No. 4,172,472; U.S. Pat. No. 4,919,017; and U.S. Pat. No. 4,188,023.

While these devices fulfill their respective, particular objectives and requirements, the aforementioned patents do not disclose a new water main break repair tool. The inventive device includes an elongate shaft with a grasping handle attached to an upper end thereof. First and second clamping assemblies are pivotally connected to a lower end of the shaft for clamping a water main therebetween. A sealing band is attached at one end thereof to the first clamping assembly while the opposite end of the band is attached to the second clamping assembly. The sealing band forms a sealed channel around a break in the water main when the main is clamped between the clamping assemblies. A manually operated actuating assembly is provided for pivoting the clamping assemblies into and out of engagement with the water main, while a locking lever maintains the assemblies in the clamped position around the water main.

In these respects, the water main break repair tool according to the present invention substantially departs from the conventional concepts and designs of the prior art, and in so doing provides an apparatus primarily developed for the purpose of permitting repair of a broken water main without depressurizing the water main.

SUMMARY OF THE INVENTION

In view of the foregoing disadvantages inherent in the known types of tools for repairing, or facilitating repair of, broken pipes and the like now present in the prior art, the present invention provides a new water main break repair tool construction wherein the same can be utilized for permitting repair of a broken water main without depressurizing the water main.

The general purpose of the present invention, which will be described subsequently in greater detail, is to provide a new water main break repair tool apparatus which has many of the advantages of the tools for repairing, or facilitating repair of, broken pipes and the like mentioned heretofore and many novel features that result in a new water main break repair tool which is not anticipated, rendered obvious, suggested, or even implied by any of the prior art tools for repairing, or facilitating repair of, broken pipes and the like, either alone or in any combination thereof.

To attain this, the present invention generally comprises an elongate shaft with a grasping handle attached to an upper end thereof. First and second clamping assemblies are pivotally connected to a lower end of the shaft for clamping a water main therebetween. A sealing band is attached at one end thereof to the first clamping assembly while the opposite end of the band is attached to the second clamping assembly. The sealing band forms a sealed channel around a break in the water main when the main is clamped between the clamping assemblies. A manually operated actuating assembly is provided for pivoting the clamping assemblies into and out of engagement with the water main, while a locking lever maintains the assemblies in the clamped position around the water main.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new water main break repair tool apparatus which has many of the advantages of the tools for repairing, or facilitating repair of, broken pipes and the like, mentioned heretofore and many novel features that result in a new water main break repair tool which is not anticipated, rendered obvious, suggested, or even implied by any of the prior art tools for repairing, or facilitating repair of, broken pipes and the like, either alone or in any combination thereof.

It is another object of the present invention to provide a new water main break repair tool which may be easily and efficiently manufactured and marketed.

It is a further object of the present invention to provide a new water main break repair tool which is of a durable and reliable construction.

An even further object of the present invention is to provide a new water main break repair tool which is susceptible of a low cost of manufacture with regard to both materials and labor, and which accordingly is then susceptible of low prices of sale to the consuming public, thereby making such water main break repair tool economically available to the buying public.

Still yet another object of the present invention is to provide a new water main break repair tool which provides in the apparatuses and methods of the prior art some of the advantages thereof, while simultaneously overcoming some of the disadvantages normally associated therewith.

Still another object of the present invention is to provide a new water main break repair tool for permitting repair of a broken water main without depressurizing the water main.

Yet another object of the present invention is to provide a new water main break repair tool which includes an elongate shaft with a grasping handle attached to an upper end thereof. First and second clamping assemblies are pivotally connected to a lower end of the shaft for clamping a water main therebetween. A sealing band is attached at one end thereof to the first clamping assembly while the opposite end of the band is attached to the second clamping assembly. The sealing band forms a sealed channel around a break in the water main when the main is clamped between the clamping assemblies. A manually operated actuating assembly is provided for pivoting the clamping assemblies into and out of engagement with the water main, while a locking lever maintains the assemblies in the clamped position around the water main.

Still yet another object of the present invention is to provide a new water main break repair tool that does not require the depressurization of a water main in order to repair a break. Since the main is not depressurized, boil orders do not need to be issued, bacteria samples do not need to be collected, water samples do not need to be analyzed for bacteriological contamination, and appropriate government agencies do not need to be contacted.

Even still another object of the present invention is to provide a new water main break repair tool that eliminates the cost of issuing boil orders and the cost of collecting and analyzing water samples.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new water main break repair tool according to the present invention in an unclamped position.

FIG. 2 is a side view similar to FIG. 1, but showing the tool in a clamped position around a water main.

DESCRIPTION OF THE PREFERRED EMBODIMENT

Figures 3, 4:
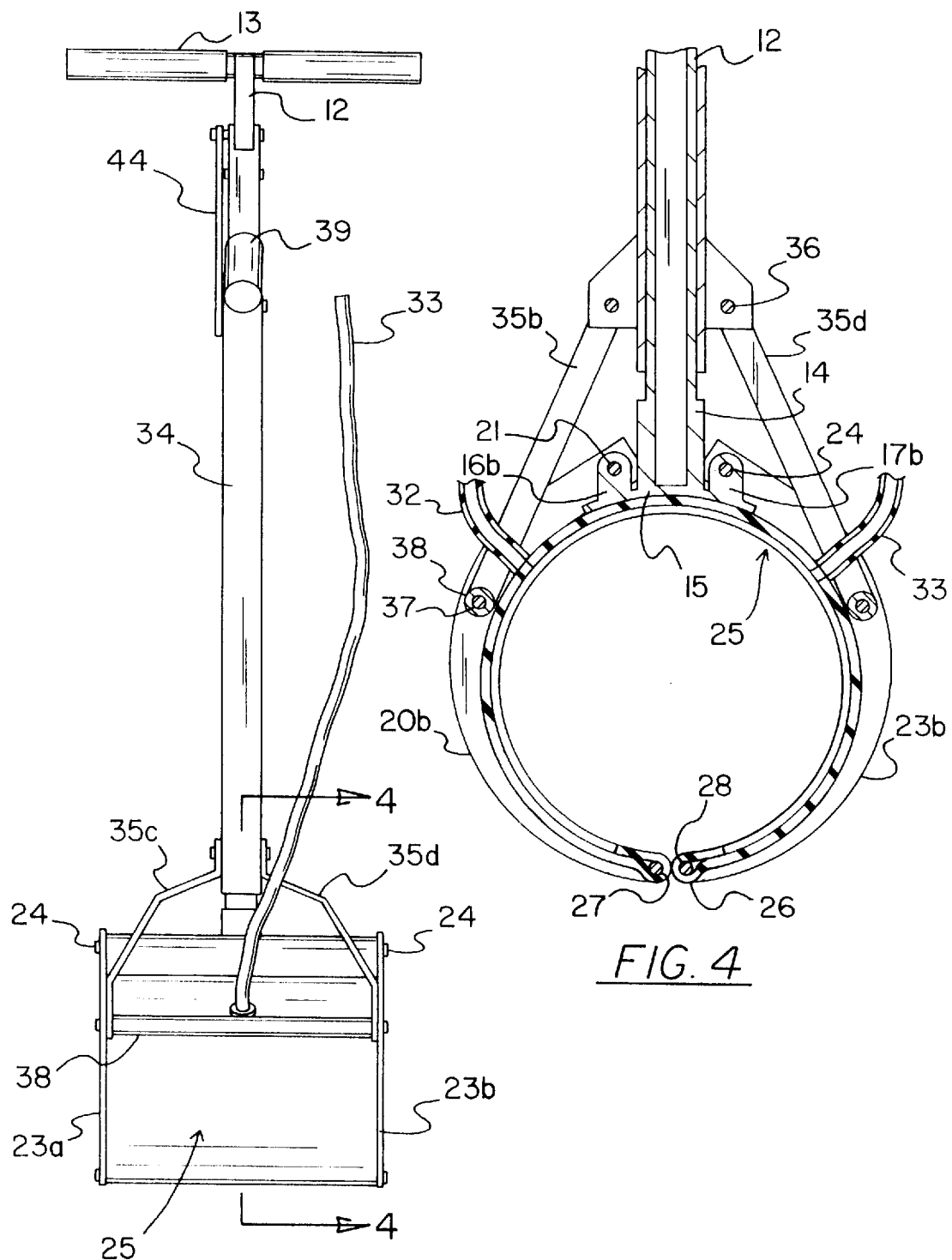
FIG. 3 is a front view of the present invention.
FIG. 4 is a cross sectional view taken along line 4—4 of FIG. 3.

With reference now to the drawings, and in particular to FIGS. 1 through 5 thereof, a new water main break repair tool embodying the principles and concepts of the present invention and generally designated by the reference numeral 10 will be described.

As best illustrated in FIGS. 1 through 5, the water main break repair tool 10 comprises an elongate shaft 12 made of a hollow, metal material. A handle 13 is connected at its center to the upper end of the shaft 12 to form with the shaft a "T" shape, so as to permit grasping and handling of the tool. The bottom end of the shaft 12 includes an enlarged portion 14 with an arcuate, central support element 15 integral with the base of the enlarged portion. The element 15 is elongated in a direction parallel to the handle 13, and includes two pairs of support flanges 16a,b and 17a,b integral therewith and disposed on opposite sides of the enlarged portion 14, with the flanges in each pair disposed at opposite ends of the element 15.

First and second clamping assemblies 18,19 are pivotally attached to the support flanges 16a,b,17a,b, respectively, for clamping a cylindrical water main 22 therebetween. The first clamping assembly 18 comprises a pair of spaced, arcuate clamping flanges 20a,b, each of which is pivotally attached at one end by a pivot 21 to a respective one of the flanges 16a,b, with the other, distal end of the flanges 20a,b being spaced from the attached end. The flanges 20a,b are sized and shaped such they encompass approximately one-half of the circumference of the cylindrical water main 22 (illustrated in dashed lines) when disposed thereabout.

The second clamping assembly 19 is similar to the first assembly 18, and includes a pair of spaced, arcuate clamping flanges 23a,b, each of which is pivotally attached to a respective one of the flanges 17a,b at one end by a pivot 24, with the other, distal end of each flange 23a,b being spaced from the attached end. The flanges 23a,b are also sized and shaped so as to encompass one-half of the circumference of the water main 22 when disposed thereabout, such that the flanges 20a,b, 23a,b encompass almost the entire circumference of the water main. As shown in FIG. 2, when the clamping flanges 20a,b,23a,b are pivoted such that they are disposed about the main 22 and in clamping engagement therewith, the distal ends of the flanges are adjacent to, or in contact with, each other at the bottom of the main 22.

A sealing band 25 is attached at opposite ends thereof to one of the clamping assemblies 18,19 for forming a sealed channel around a broken portion of the main 22 when the clamping assemblies are clamped around the main. The band 25 is elongated such that it can substantially encircle the circumference of the water main, and is made of a flexible rubber, or rubber-like, material permitting it to conform to the outer surface of the water main.

Figure 5:
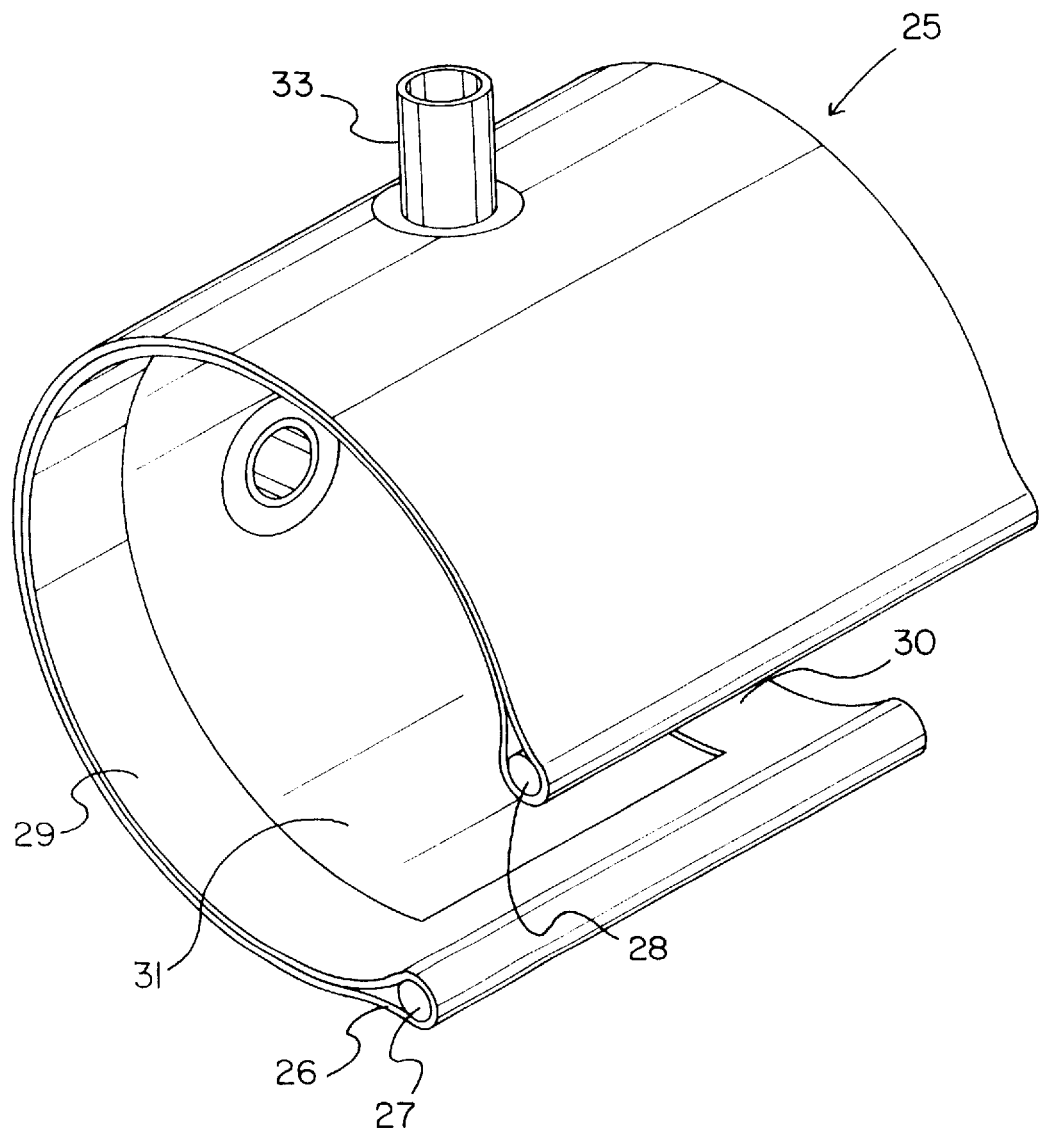
FIG. 5 is a perspective view of the sealing band.

As best illustrated in FIGS. 4 and 5, each end of the band 25 is looped 26, with one looped end 26 being disposed between the distal ends of the clamping flanges 20a,b and secured thereto by a rod 27 extending between the flanges 20a,b and through the looped end 26. The second looped end 26 is disposed between the distal ends of the clamping flanges 23a,b and secured thereto by a rod 28 extending between the flanges 23a,b and through the second looped end 26. The remainder of the band 25 is not secured to any of the other tool structure, such that the band 25 is loosely disposed between the clamping assemblies 18,19. When the clamping flanges are clamped onto the water main, the band 25 encircles the water main with the looped ends 26 of the band contacting each other at the bottom of the water main, and the arcuate central element 15 clamping the central portion of the band onto the top of the water main, as best seen in FIG. 4.

The details of the band are best shown in FIG. 5, where it can be seen that the band includes a pair of spaced sealing ridges 29,30 extending the length thereof between the looped ends 26. The ridges 29,30 engage the outer surface of the water main forming a seal therewith when the tool is clamped onto the main. A recessed channel 31 is defined between the ridges for receiving water which escapes from the break in the water main. Additionally, a pair of hoses 32,33 having inlets communicating with the channel 31, extend from the outer surface of the band for leading water away from channel to a location remote the water main break.

In order to actuate the clamping assemblies into clamping engagement with the water main, an actuating mechanism is provided. The actuating mechanism comprises a sleeve 34 slidably disposed on the shaft 12 for sliding movements both upward and downward on the shaft. Connecting bars 35a–d are pivotally connected at one end thereof by pivots 36 to the lower end of the sleeve 34, and connected by pivots 37 at their opposite ends to respective ones of the clamping flanges 20a,b,23a,b, respectively. A spacing sleeve 38 surrounds each of the pivots 37 and extends between the pairs of clamping flanges 20a,b and 23a,b, in order to maintain the spacing between the flanges. Thus when the sleeve slides up and down on the shaft, the bars 35a–d cause pivoting of the clamping flanges.

An actuating handle 39, for causing movements of the sleeve on the shaft, is pivotally attached to the shaft by a pivot 40 at a location below the handle 13 and above the sleeve 34. A linkage bar 41 is pivotally connected at one end by a pivot 42 to the actuating handle 39 and at its opposite end by a pivot 43 to the top end of the sleeve. When the handle 39 is manually moved up and down, this movement is transmitted by the linkage bar 41 to the top of the sleeve, which is caused to move up or down. Locking lever 44 is also attached to the shaft 12 by the pivot 40, such that it can pivot into and out of engagement with the sleeve 34 for locking the sleeve in a clamping position. The lever 44 includes a notch 45 formed therein which is selectively engaged with the pivot 43 for locking the sleeve in position, as shown in FIG. 2.

In use, when a water main breaks or ruptures, the tool is clamped around the main at the location of the break such that the sealing ridges 29,30 are disposed on opposite sides of the break with the break thus being aligned with the recessed channel. The clamping flanges clamp the water main therebetween and hold the sealing band in place. The sealing ridges seal with the outer surface of the main, thus preventing water from escaping past the sealing ridges and out the sides of the tool. Therefore almost all the water is constrained to the recessed channel. The water escaping from the break and flowing into the recessed channel then flows out through the hoses 32,33 to a remote location. The tool is locked in the clamped position by the locking lever 44 so that the clamping assemblies are not prematurely released.

Therefore the break in the main is temporarily enclosed so that workers trying to fix the break remain dry, and the water main does not therefore need to be depressurized. The repair of the break can thus commence by first cleaning the water main on either side of the tool. A conventional repair clamp is then loosely installed on the main on one side of the tool. The locking lever is released and the actuating handle pivoted upward such that the repair tool is loosened slightly. The repair clamp would then be slid in the direction of the break, thus simultaneously forcing the repair tool off the area of the break. Once the repair clamp is in position over the break, it is tightened in place, thus completing the repair.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for temporarily enclosing a break in a water main, comprising:

an elongate shaft with a handle attached to an upper end thereof;

first and second clamping assemblies pivotally connected to a lower end of the elongate shaft, said clamping assemblies being disposed relative to each other such that they are able to clamp the water main therebetween;

a sealing band attached to the clamping assemblies for forming a sealed channel around the portion of the water main containing the break when the water main is clamped between the clamping assemblies;

an actuating means for pivoting the clamping assemblies into and out of clamping engagement with the water main;

wherein said first and second clamping assemblies each comprise a pair of spaced clamping flanges, each said flange being pivotally connected at one end thereof to the lower end of the shaft and having a distal end spaced from said one end;

wherein said sealing band comprises an elongate flexible member secured at opposite ends thereof to the distal ends of the clamping flanges of the first and second clamping assemblies; and wherein the ends of the flexible member are looped, one of the looped ends being disposed between the pair of spaced clamping flanges of the first clamping assembly, and the other looped end being disposed between the pair of spaced clamping flanges of the second clamping assembly.

2. The tool according to claim 1, wherein said clamping flanges are arcuate in shape such that the flanges of said first clamping assembly encompass approximately one-half of the circumference of the water main when in clamping engagement therewith, and the flanges of the second clamping assembly encompass approximately the other one-half of the circumference of the water main when in clamping engagement therewith.

3. The tool according to claim 2, wherein the distal ends of the clamping flanges of the first clamping assembly are disposed adjacent the distal ends of the clamping flanges of the second clamping assembly when the clamping assemblies are in clamping engagement with the water main.

4. The tool according to claim 1, wherein the looped ends contact each other when the clamping assemblies are in clamping engagement with the water main.

5. The tool according to claim 1, wherein the elongate flexible member includes a pair of spaced sealing ridges integral therewith which extend the length of the flexible member, said spaced sealing ridges defining a recessed channel therebetween, the sealing ridges sealing with the outer surface of the water main when the clamping assemblies are in clamping engagement with the water main such that water escaping from the break flows into the recessed channel.

6. The tool according to claim 5, wherein the flexible member further includes means for directing water from the recessed channel.

7. The tool according to claim 6, wherein said means for directing water comprises at least one hose extending from the flexible member and in flow communication with the recessed channel.

8. A tool for temporarily enclosing a break in a water main, comprising:

an elongate shaft with a handle attached to an upper end thereof;

first and second clamping assemblies pivotally connected to a lower end of the elongate shaft, said clamping assemblies being disposed relative to each other such that they are able to clamp the water main therebetween;

a sealing band attached to the clamping assemblies for forming a sealed channel around the portion of the water main containing the break when the water main is clamped between the clamping assemblies;

an actuating means for pivoting the clamping assemblies into and out of clamping engagement with the water main;

wherein said first and second clamping assemblies each comprise a pair of spaced clamping flanges, each said flange being pivotally connected at one end thereof to the lower end of the shaft and having a distal end spaced from said one end;

wherein said sealing band comprises an elongate flexible member secured at opposite ends thereof to the distal ends of the clamping flanges of the first and second clamping assemblies; and an arcuate central support element at the lower end of the shaft, said support element supporting a central portion of the flexible member when the clamping assemblies are in clamping engagement with the water main.

9. The tool according to claim 8, wherein said support element includes support flanges extending therefrom, the one ends of the clamping flanges being pivotally attached to the support flanges.

10. A tool for temporarily enclosing a break in a water main, comprising:

an elongate shaft with a handle attached to an upper end thereof:

first and second clamping assemblies pivotally connected to a lower end of the elongate shaft, said clamping assemblies being disposed relative to each other such that they are able to clamp the water main therebetween;

a sealing band attached to the clamping assemblies for forming a sealed channel around the portion of the water main containing the break when the water main is clamped between the clamping assemblies;

an actuating means for pivoting the clamping assemblies into and out of clamping engagement with the water main;

wherein said first and second clamping assemblies each comprise a pair of spaced clamping flanges, each said flange being pivotally connected at one end thereof to the lower end of the shaft and having a distal end spaced from said one end; and wherein said actuating means comprises a sleeve slidably disposed on said elongate shaft, connecting bars extending between the sleeve and the clamping flanges, and means for sliding the sleeve up and down on the elongate shaft.

11. The tool according to claim 10, wherein said means for sliding comprises an actuating handle pivotally attached to the elongate shaft and a linkage bar extending between the actuating handle and the sleeve.

12. The tool according to claim 11, further comprising means for locking the clamping assemblies in clamping engagement with the water main.

13. The tool according to claim 12, wherein said means for locking comprises a locking lever pivotally attached to the elongate shaft, said locking lever including a notch formed therein for selective locking engagement with the sleeve.

* * * * *